(12) United States Patent
Ohara et al.

(10) Patent No.: US 7,300,545 B2
(45) Date of Patent: Nov. 27, 2007

(54) WATER-SOLUBLE POLYMER DISPERSION, PROCESS FOR PRODUCING THE SAME AND METHOD OF USE THEREFOR

(75) Inventors: Takumi Ohara, Tokyo (JP); Emiko Odaka, Tokyo (JP); Ryousuke Yonemoto, Tokyo (JP)

(73) Assignee: Hymo Corporation, Tokyo (JP)

( * ) Notice: Subject to any disclaimer, the term of this patent is extended or adjusted under 35 U.S.C. 154(b) by 116 days.

(21) Appl. No.: 10/517,011

(22) PCT Filed: Feb. 25, 2003

(86) PCT No.: PCT/JP03/02075

§ 371 (c)(1),
(2), (4) Date: Jul. 7, 2005

(87) PCT Pub. No.: WO04/000944

PCT Pub. Date: Dec. 31, 2003

(65) Prior Publication Data

US 2006/0162882 A1    Jul. 27, 2006

(30) Foreign Application Priority Data

| Jun. 21, 2002 | (JP) | 2002-180845 |
| Jun. 21, 2002 | (JP) | 2002-180847 |
| Jul. 11, 2002 | (JP) | 2002-202538 |
| Jul. 11, 2002 | (JP) | 2002-202698 |
| Jul. 29, 2002 | (JP) | 2002-219448 |

(51) Int. Cl.
  D21H 21/10 (2006.01)
  D21H 17/41 (2006.01)
  D21H 17/56 (2006.01)
  C07C 211/00 (2006.01)
  C07C 211/62 (2006.01)
  C08F 2/00 (2006.01)

(52) U.S. Cl. ............... 162/158; 162/164.6; 162/166; 162/168.2; 564/281; 564/291; 564/292; 564/295; 526/88; 526/217; 526/312

(58) Field of Classification Search ........... 162/158, 162/164.6, 166, 168.2; 564/281, 291, 292, 564/295; 526/88, 217, 312
See application file for complete search history.

(56) References Cited

U.S. PATENT DOCUMENTS

| 3,632,559 | A | * | 1/1972 | Matter et al. ............... 525/430 |
| 4,054,542 | A | * | 10/1977 | Buckman et al. ........... 528/405 |
| 4,250,112 | A | * | 2/1981 | Lobach et al. .............. 564/291 |
| 4,250,269 | A | * | 2/1981 | Buckman et al. ........... 524/236 |
| 4,380,600 | A | * | 4/1983 | Hosoda et al. .............. 524/458 |
| 5,009,880 | A | * | 4/1991 | Grollier et al. ............... 424/47 |
| 5,274,055 | A | * | 12/1993 | Honig et al. .................. 524/47 |
| 5,760,386 | A | * | 6/1998 | Ward .......................... 235/493 |
| 5,840,804 | A | * | 11/1998 | Carl et al. ................... 524/555 |
| 5,912,306 | A | * | 6/1999 | Pudney et al. .............. 525/430 |
| 5,952,394 | A | | 9/1999 | Nguyen |
| 6,217,778 | B1 | * | 4/2001 | Shing et al. ................ 210/708 |

FOREIGN PATENT DOCUMENTS

| EP | 0 262 945 | 4/1988 |
| JP | 2003-041136 | 2/2003 |
| JP | 2003-073570 | 3/2003 |
| WO | WO 99/14275 | 3/1999 |

* cited by examiner

Primary Examiner—Eric Hug
Assistant Examiner—Dennis Cordray
(74) Attorney, Agent, or Firm—Weingarten, Schurgin, Gagnebin & Lebovici LLP

(57) ABSTRACT

A water-soluble polymer dispersion, process for producing the same and a method of use therefor. In particular, the water-soluble polymer dispersion is one comprising water-soluble polymer fine particles of 100 μm or less diameter having at least one ionic property selected from among cationic, amphoteric, nonionic and anionic properties together with a polyalkyleneimine and/or a product of polyalkyleneimine modification wherein according to necessity an appropriate amount of water-soluble inorganic salt is incorporated. The provided process enables easily performing the production in dispersed form by means of production facilities of low cost. The obtained water-soluble polymer dispersion is excellent in storage stability and exhibits satisfactory fluidity and solubility so as to enable use in papermaking raw material pretreatments added to papermaking raw materials prior to machine operation and also for enhancement of freeness, increase of sizing degree and enhancement of yield. Further use can be found in incorporation in an organic sludge or paper mill sludge for flocculation and ensuing drainage.

17 Claims, No Drawings

WATER-SOLUBLE POLYMER DISPERSION, PROCESS FOR PRODUCING THE SAME AND METHOD OF USE THEREFOR

This application is a 371 national phase filing of PCT/JP2003/002075 filed Feb. 25, 2003, and claims priority to five Japanese applications as follows:
Application No. 2002-180845 filed Jun. 21, 2002;
Application No. 2002-180847 filed Jun. 21, 2002;
Application No. 2002-202538 filed Jul. 11, 2002;
Application No. 2002-202698 filed Jul. 11, 2002; and
Application No. 2002-219448 filed Jul. 29, 2002.

TECHNICAL FIELD

This invention relates to a water-soluble polymer dispersion, a process for producing the same, and a method of use therefor. More specifically, it relates to a water-soluble polymer dispersion in which fine particles of a water-soluble polymer having at least one type of ionicity selected from among cationicity, amphotericity, nonionicity and anionicity with a particle size not larger than 100 μm and a polyalkylenimine and/or a modified polyalkylenimine coexist, if necessary together with a necessary amount of a water-soluble inorganic salt, and to a method of producing the same. The water-soluble polymer dispersion of the invention can be used in the pretreatment of paper stuff by adding the same to paper stuff before papermaking to thereby improve the freeness, sizing degree and yield rate. It can further be added to organic sludge or paper mill-derived sludge for application thereof in flocculation and the subsequent dewatering treatment.

BACKGROUND ART

As for the method of producing water-soluble cationic polymer dispersions, which are used as auxiliary agents in papermaking or as flocculants in waste water treatment, by carrying out copolymerization using a cationic monomer prepared by quaternizing dimethylaminoethyl(meth)acrylate or the like with benzyl chloride or a hydrophobic alkyl monohalide, a method of producing polymers in a dispersed state is disclosed in Japanese Kokai Publication (Laid-open Japanese Patent Application; JP Kokai) S61-123610 and Japanese Kokai Publication H05-32722 which method comprises carrying out the polymerization in an aqueous salt solution, in which the monomer or copolymer comprising the above-mentioned cationic monomer is not soluble, in the presence of a polymer soluble in that aqueous salt solution.

This method has a drawback in that such a specific hydrophobic cationic monomer as the product of quaternization of dimethylaminoethyl(meth)acrylate or the like with benzyl chloride or a hydrophobic alkyl monohalide must be used as the cationic monomer. A homopolymer of dimethylaminoethyl(meth)acrylate or the like or a copolymer thereof with acrylamide or the like is used as the coexisting polymer soluble in an aqueous salt solution.

On the other hand, a method of producing dispersions comprising fine water-soluble polymer particles and, as a dispersion medium, an aqueous solution of a polymer such as polyethylene glycol is disclosed in Japanese S62-5170. Polyethylene glycol is not only expensive but also ineffective as an auxiliary agent in papermaking or as a flocculent. It is used in a large amount in the step of polymerization, thus causing an increase in raw material cost.

On the other hand, polyethylenimine, one of polyalkylenimines, is in use as a freeness improving agent or a yield aid in papermaking and, therefore, a water-soluble polymer dispersion in which a polyalkylenimine coexists is thought to have a very efficient form.

As mentioned above, water-soluble polymers are widely used in the paper industry as freeness improving agents and yield aids in the process of papermaking or agents for recovering valuable resources from white water, for instance. Further, they can be used also as oil separating agents to be used in the process of oil manufacturing or of oil separation and treatment of oil-containing industrial waste water, or as agents to be added to city sewage, human waste, general industrial waste water-derived raw sludge, biologically treated sludge, digested sludge, or mixed sludge derived therefrom, in the treatment thereof for flocculation or in dewatering in dewatering equipment following flocculation.

Thus, it is an object of the present invention to develop such water-soluble polymers that are industrially useful in the form of dispersions excellent in storage stability, fluidity and solubility and capable of being produced with ease using low cost production equipment, and to provide a producing method of the dispersions.

DISCLOSURE OF THE INVENTION

As a result of various investigations made by them to accomplish the above objects, the present inventors have completed the present invention as disclosed below.

Thus, the invention set forth in Claim 1 relates to a water-soluble polymer dispersion in which a water-soluble polymer having at least one type of ionicity selected from among cationicity, amphotericity, nonionicity and anionicity and occurring as fine particles with a particle size of not greater than 100 μm and a polyalkylenimine and/or a modified polyalkylenimine coexist, if necessary together with a necessary amount of a water-soluble inorganic salt.

The invention set for the in Claim 2 relates to a water-soluble polymer dispersion according to Claim 1, wherein the water-soluble polymer having at least one type of ionicity selected from among the cationicity and the amphotericity and occurring in the form of fine particles is produced by dispersion polymerization of a monomer (or monomer mixture) comprising 5 to 100 mole percent of a monomer represented by the general formula (1) and/or (2) given below, 0 to 50 mole percent of a monomer represented by the general formula (3) given below and 0 to 95 mole percent of a water-soluble nonionic monomer with stirring in the presence of the above-mentioned polyalkylenimine and/or modified polyalkylenimine, if necessary further in the presence of a necessary amount of a water-soluble inorganic salt.

General formula (1)

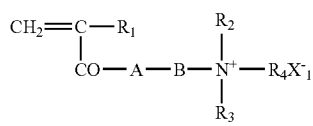

(In the general formula (1), $R_1$ is a hydrogen atom or a methyl group, $R_2$ and $R_3$ may be the same or different and each is an alkyl or alkoxy group containing 1 to 3 carbon atoms or a benzyl group, $R_4$ is a hydrogen atom, an alkyl or alkoxy group containing 1 to 3 carbon atoms or a benzyl group. A represents an oxygen atom or NH, B an alkylene or alkoxylene group containing 2 to 4 carbon atoms, and $X_1$ an anion.)

General formula (2)

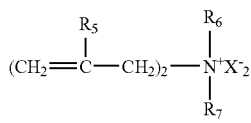

(In the general formula (2), $R_5$ represents a hydrogen atom or a methyl group, $R_6$ and $R_7$ each represents an alkyl or alkoxy group containing 1 to 3 carbon atoms or a benzyl group, and $X_2$ represents an anion.)

General formula (3)

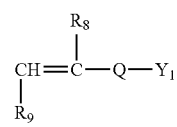

(In the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or COO, $R_9$ represents a hydrogen atom or $COOY_2$, and $Y_1$ or $Y_2$ represents a hydrogen atom or a cation.)

The invention set forth in Claim 3 relates to a water-soluble polymer dispersion according to Claim 1, wherein the water-soluble polymer having at least one type of ionicity selected from among anionicity and nonionicity and occurring in the form of fine particles is produced by dispersion polymerization with stirring of a monomer (or monomer mixture) comprising at least one monomer selected from among monomers represented by the general formula (3) given above and water-soluble nonionic monomers in the presence of the above-mentioned polyalkylenimine and/or modified polyalkylenimine, if necessary further in the presence of a necessary amount of a water-soluble inorganic salt.

The invention set forth in Claim 4 relates to a water-soluble polymer dispersion according to any of Claims 1 to 3, wherein the modified polyalkylenimine has a structural unit represented by the general formula (4) and/or (5) given below.

General formula (5)

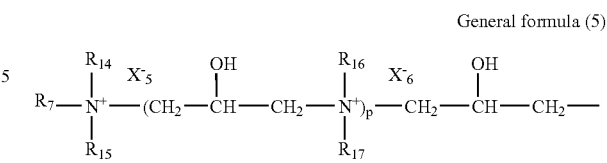

(In the general formulas (4) and (5), p is an integer of 0 to 20, $R_{10}$ to $R_{17}$ each represents a hydrogen atom or an alkyl or hydroxyalkyl group containing 1 to 3 carbon atoms or a benzyl group, and $X_3$ to $X_6$ each is an anion.)

The invention set forth in Claim 5 relates to a water-soluble polymer dispersion according to any of Claims 1 to 4, wherein the modified polyalkylenimine comprises the reaction product from a polyalkylenimine or a mixture of a polyalkylenimine and a polyamine and a polycationic substance represented by the general formula (6) and/or (7) given below.

General formula (6)

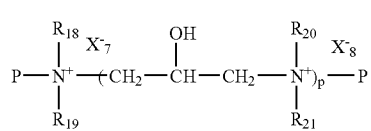

General formula (7)

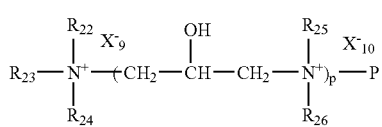

(In the general formulas (6) and (7), P is an epoxy group or a halohydrin group, p is an integer of 0 to 20, $R_{18}$ to $R_{26}$ each is a hydrogen atom, an alkyl or hydroxyalkyl group containing 1 to 3 carbon atoms or a benzyl group, and $X_7$ to $X_{10}$ each is an anion.)

The invention set forth in Claim 6 relates to a water-soluble polymer dispersion according to any of Claims 1 to 4, wherein the modified polyalkylenimine is crosslinked by means of a polycationic substance represented by the general formula (6) given above.

The invention set forth in Claim 7 relates to a water-soluble polymer dispersion according to any of Claims 1 to 6, wherein the polyalkylenimine is polyethylenimine.

The invention set forth in Claim 8 relates to a water-soluble polymer dispersion according to any of Claims 1 to 7, wherein the polyalkylenimine and/or modified polyalkylenimine amounts to 20 to 200% by mass relative to the General formula (4)

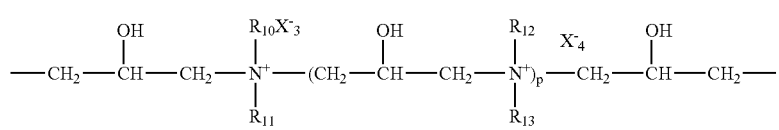

water-soluble polymer having at least one type of ionicity selected from among cationicity, amphotericity, nonionicity and anionicity.

The invention set forth in Claim 9 relates to a method of producing water-soluble polymer dispersions, wherein a dispersion of fine particles of a polymer having at least one type of ionicity selected from among cationicity and amphotericity is produced by subjecting a monomer (or monomer mixture) comprising 5 to 100 mole percent of a monomer represented by the general formula (1) and/or (2) given below, 0 to 50 mole percent of a monomer represented by the general formula (3) given below and 0 to 95 mole percent of a water-soluble nonionic monomer to dispersion polymerization with stirring in the presence of a polyalkylenimine and/or a modified polyalkylenimine, if necessary further in the presence of a necessary amount of a water-soluble inorganic salt.

General formula (1)

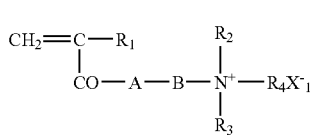

(In the general formula (1), $R_1$ is a hydrogen atom or a methyl group, $R_2$ and $R_3$ may be the same or different and each is an alkyl or alkoxy group containing 1 to 3 carbon atoms or a benzyl group, $R_4$ is a hydrogen atom, an alkyl or alkoxy group containing 1 to 3 carbon atoms or a benzyl group. A represents an oxygen atom or NH, B an alkylene or alkoxylene group containing 2 to 4 carbon atoms, and $X_1$ an anion.)

General formula (2)

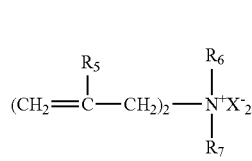

(In the general formula (2), $R_5$ represents a hydrogen atom or a methyl group, $R_6$ and $R_7$ each represents an alkyl or alkoxy group containing 1 to 3 carbon atoms or a benzyl group, and $X_2$ represents an anion.)

General formula (3)

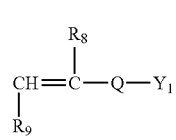

(In the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or COO, $R_9$ represents a hydrogen atom or $COOY_2$, and $Y_1$ or $Y_2$ represents a hydrogen atom or a cation.)

The invention set forth in Claim 10 relates to a method of producing water-soluble polymer dispersions, wherein a dispersion of fine particles of a polymer having at least one type of ionicity selected from among anionicity and nonionicity is produced by subjecting a monomer composition (mixture) comprising at least one monomer selected from among monomers represented by the general formula (3) given below and water-soluble nonionic monomers to dispersion polymerization with stirring in the presence of a polyalkylenimine and/or a modified polyalkylenimine, if necessary further in the presence of a necessary amount of a water-soluble inorganic salt.

General formula (3)

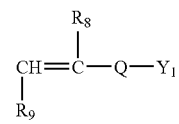

(In the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or COO, $R_9$ represents a hydrogen atom or $COOY_2$, and $Y_1$ or $Y_2$ represents a hydrogen atom or a cation.)

The invention set forth in Claim 11 relates to a method of using the water-soluble polymer dispersion according to any of Claims 1 to 8, wherein the water-soluble polymer dispersion is added to paper making raw material before papermaking for pretreatment thereof.

The invention set forth in Claim 12 relates to a method of using the water-soluble polymer dispersion according to any of Claims 1 to 8, wherein the water-soluble polymer dispersion is added to paper making raw material before papermaking to thereby improve the freeness thereof.

The invention set forth in Claim 13 relates to a method of using the water-soluble polymer dispersion according to any of Claims 1 to 8, wherein the water-soluble polymer dispersion is added to paper making raw material before papermaking, in which a sizing agent coexists, to thereby improve the degree of sizing.

The invention set forth in Claim 14 relates to a method of using the water-soluble polymer dispersion according to any of Claims 1 to 8, wherein the water-soluble polymer dispersion is added to paper making raw material before papermaking to thereby improve the yield, followed by papermaking.

The invention set forth in Claim 15 relates to a method of using the water-soluble polymer dispersion according to any of Claims 1 to 8, wherein the water-soluble polymer dispersion is added to paper stuff before papermaking in combination with an inorganic and/or organic anionic substance to thereby improve the yield, followed by papermaking.

The invention set forth in Claim 16 relates to a method of using the water-soluble polymer dispersion according to any of Claims 1 to 8, wherein the water-soluble polymer dispersion is added to organic sludge or paper mill-derived sludge to cause flocculation, followed by dewatering by means of dewatering equipment.

The invention set forth in Claim 17 relates to a method of using the water-soluble polymer dispersion according to any of Claims 1 to 8, wherein the water-soluble polymer dispersion is added to organic sludge or paper mill-derived sludge in combination with an amphoteric or anionic water-soluble polymer to cause flocculation, followed by dewatering by means of dewatering equipment.

The characteristic feature of the present invention is that a dispersion comprising fine water-soluble polymer particles is produced by subjecting a monomer or monomers to polymerization with stirring in the presence of polyethylenimine and/or a modification of polyethylenimine, which is useful as an auxiliary agent in papermaking, if necessary in the presence of a necessary amount of an inorganic salt.

When monomers represented by the general formula (1) or (2) given above are polymerized in the presence of polyethylene glycol or dimethyldiallylammonium chloride in the conventional manner, the resulting polymer dispersions occur as highly viscous dispersions and the molecular weights of the polymers are not so high. On the contrary, when the polymerization is carried out in the presence of polyethylenimine and/or a modification of polyethylenimine according to the present invention, these problems can be solved.

In the following, the invention is described more specifically.

First, a 20 to 50% (by mass) aqueous solution of polyethylenimine and/or a modification of polyethylenimine is prepared and 50 to 100% of the amine equivalent is neutralized with an organic or inorganic acid. On that occasion, the pH of the aqueous solution is adjusted to 2 to 12, and the monomer or monomers are added to this aqueous solution, followed by mixing up. The monomer concentration is 10 to 40% by mass, preferably 15 to 30% by mass. The level of addition of polyethylenimine and/or a modification of polyethylenimine is 20 to 200% by mass, preferably 20 to 150% by mass, more preferably 30 to 150% by mass, based on the water-soluble polymer. If necessary, a necessary amount of an inorganic salt is added and, preferably it is added to and dissolved in the system preferably in an amount to give a concentration within the range from 2% by mass based on the whole amount to its saturation concentration.

Then, radical polymerization is carried out with stirring in a nitrogen atmosphere by adding a polymerization initiator, for example a water-soluble azo type polymerization initiator, such as 2,2'-azobis(amidinopropane)dihydrochloride or 2,2'-azobis[2-(5-methyl-2-imidazolin-2-yl)propane] dihydrochloride, or a water-soluble redox system polymerization initiator, such as ammonium persulfate in combination with sodium hydrogensulfite.

The polymerization reaction temperature can be appropriately selected within the range of 0 to 100° C. according to the properties of the polymerization initiator employed. Preferably, that temperature is 10 to 60° C., more preferably 20 to 50° C.

The polyalkylenimine to be used according to the invention includes polyethylenimine and polypropylenimine, among others, and polyethylenimine is suited for practical use. When it has a molecular weight of not lower than 5,000, it can be used in the dispersion polymerization according to the invention. An excessively high degree of polymerization is not preferred since it renders the viscosity of the dispersion high. Therefore, the molecular weight is preferably not lower than 5,000 but not higher than 500,000, more preferably not lower than 5,000 but not higher than 200,000. In the case of a modified polyalkylenimine, the molecular weight after modification is preferably not lower than 50,000 but not higher than 1,000,000, more preferably not lower than 50,000 but not higher than 500,000.

Modified polyalkylenimines can also be used. For example, polyalkyelenimines modified by crosslinking with epichlorohydrin, ethylene glycol diglycidyl ether or the like can be used. Those modified polyalkylenimines which have a structural unit represented by the general formula (4) or (5) given hereinabove are preferably used, however.

These are synthesized by reacting a polyalkylenimine or a mixture of a polyalkylenimine and a polyamine with a polycationic substance represented by the general formula (6) and/or (7) given hereinabove. The latter substance can be produced by reacting at least one amine selected from among ammonia and aliphatic primary to tertiary amines (hereinafter referred to as "primary amines etc.") with an epihalohydrin.

The modification reaction is carried out within the following mole ratio range. Thus, when the amino group content in the polyalkylenimine or the polyalkylenimine-polyamine mixture is C (in moles) and the halohydrin group and/or epoxy group content in the polycationic substance is D (in moles), the reaction is carried out in the C/D ratio range of 5 to 300 (mole percent).

When, for example, the polyalkylenimine has a molecular weight as high as tens of thousands to hundreds of thousands, charging of a polycationic substance represented by the general formula (6) given hereinabove, in particular, in a high proportion will result in excessive progress of the crosslinking reaction and the modified polyalkylenimine will be no longer soluble in water. Therefore, the mole percent to be employed in charging is generally 5 to 50 mole percent, preferably 5 to 30 mole percent. On the other hand, when the polyalkylenimine has a low molecular weight, for example 1,000 to 10,000, the charging mole percent is generally 50 to 300 mole percent, preferably 70 to 150 mole percent.

The polycationic substance mentioned above includes those represented by the general formula (6) given hereinabove which are reactive and capable of crosslinking at both termini and those represented by the general formula (7) given hereinabove which are reactive at one terminus alone and capable of reacting in the manner of grafting.

In the case of the former ones capable of crosslinking, the yield proportion of the polycationic substance represented by the general formula (6) given above increases when one or more amines selected from among ammonia, primary amines, secondary amines and tertiary amines are subjected to reaction in a mole ratio within the range of about 0.25 to 0.9 relative to the epihalohydrin and, in the case of the latter ones having grafting activity, the yield proportion of the polycationic substance represented by the general formula (7) given above increases when one or more amines selected from among ammonia, primary amines, secondary amines and tertiary amines are subjected to reaction in a mole ratio within the range of about 0.8 to 1.2 relative to the epihalohydrin.

Generally, when the polymerization is carried out under neutral to acidic conditions, the monomer or monomers are stable, the reactivity is good, and the degree of polymerization and the rate of polymerization are improved and, therefore, the polyalkylenimine or modified polyalkylenimine is preferably neutralized to give a weakly alkaline to acidic aqueous solution. The pH is 12 to 2, preferably 10 to 3, more preferably 6 to 3. The acid to be used for neutralization may be an organic acid or an inorganic acid. Among the organic acids, formic acid, acetic acid, adipic acid and the like are used for neutralization and, among the inorganic acids, hydrochloric acid, sulfuric acid, sulfamic acid and the like are used. The degree of neutralization is 50 to 100 equivalent percent based on the amino groups occurring in the molecule.

The inorganic salt to be used in combination with the polyalkylenimine and/or modified polyalkylenimine in the step of polymerization according to need includes alkali metal halides, sulfates, and phosphates, among others. Specific examples are sodium chloride, potassium chloride, sodium bromide, ammonium chloride, potassium bromide, ammonium bromide, ammonium sulfate, sodium sulfate, magnesium sulfate, aluminum sulfate, ammonium hydrogen phosphate, sodium hydrogen phosphate, and potassium hydrogen phosphate. These salts are preferably used at a concentration in liquid from 2% by mass to the saturation concentration.

The addition of a chain transfer agent, such as isopropyl alcohol or a mercaptan, which is used in ordinary radical polymerization for the purpose of molecular weight adjustment, can be optionally employed. For stabilizing the dispersion of fine polymer particles, stirring is necessary. There is no upper limit to the rate of stirring, and arbitrary stirring conditions may be selected.

Now, the monomers to be used in producing the water-soluble ionic polymers are described.

In producing water-soluble cationic polymers, one or more cationic monomers are used and they may be copolymerized with a nonionic monomer or monomers. As examples of the cationic monomer, there may be mentioned dimethylaminoethyl(meth)acrylate and dimethylaminopropyl(meth)acrylamide represented by the above general formula (1) and methyldiallylamine and the like for producing polymers and copolymers. Examples of the monomer for producing quaternary ammonium group-containing polymers are the products of quaternization of the above-mentioned tertiary amino group-containing monomers with methyl chloride or benzyl chloride, for example (meth) acryloyloxyethyltrimethylammonium chloride, (meth)acryloyloxy-2-hydroxypropyltrimethylammonium chloride, (meth)acryloylaminopropyltrimethylammonium chloride, (meth)acryloyloxyethyldimethylbenzylammonium chloride, (meth)acryloyloxy-2-hydroxypropyldimethylbenzylammonium chloride, (meth)acryloylaminopropyldimethylbenzylammonium chloride, and the like. It is also possible to use dimethyldiallylammonium type monomers represented by the general formula (2). Examples are dimethyldiallylammonium chloride and diallylmethylbenzylammonium chloride.

As examples of the nonionic monomer, there may be mentioned (meth)acrylamide, N,N-dimethylacrylamide, vinyl acetate, acrylonitrile, methyl acrylate, 2-hydroxyethyl (meth)acrylate, diacetone acrylamide, N-vinylpyrrolidone, N-vinylformamide, N-vinylacetamide, acryloylmorpholine, and acryloylpiperazine.

In producing water-soluble amphoteric polymers, an anionic monomer represented by the above general formula (3) is copolymerized in addition to the above-mentioned cationic and nonionic monomers. It may be, for example, a sulfonic group-containing one or a carboxyl group-containing one or a combination of both.

Examples of the sulfonic group-containing monomer are, for example, vinylsulfonic acid, vinylbenzenesulfonic acid, and 2-acrylamido-2-methylpropanesulfonic acid. Examples of the carboxyl group-containing monomer are methacrylic acid, acrylic acid, itaconic acid, maleic acid, and p-carboxystyrene, among others.

In producing water-soluble anionic polymers, they are produced by copolymerizing one or more anionic monomers represented by the above general formula (3) or copolymerizing such an anionic monomer and a water-soluble nonionic monomer. As examples of the anionic monomer and water-soluble nonionic monomer, such ones as mentioned above are used.

Further, in producing water-soluble nonionic polymers, one or more of the above-mentioned nonionic monomers are used. A particularly preferred water-soluble nonionic monomer is acrylamide.

The polymerization is initiated using a radical polymerization initiator. Such an initiator may be an oil-soluble one or a water-soluble one. Azo type, peroxide type and redox type ones can be used for carrying out the polymerization.

As examples of the oil-soluble azo type initiator, there may be mentioned 2,2'-azobisisobutyronitrile, 1,1'-azobis (cyclohexanecarbonitrile), 2,2'-azobis(2-methylbutyronitrile), 2,2'-azobis(2-methylpropionate), and 4,4'-azobis(4-methoxy-2,4-dimethylvaleronitrile). In adding these, they are dissolved in a water-miscible solvent.

As examples of the water-soluble azo type initiator, there may be mentioned 2,2'-azobis(amidinopropane)dihydrochloride, 2,2'-azobis[2-(5-methyl-2-imidazolin-2-yl)propane dihydrochloride, and 4,4'-azobis(4-cyanovaleric acid).

As examples of the redox system, there may be mentioned combinations of ammonium peroxodisulfate with sodium sulfite, sodium hydrogen sulfite, trimethylamine, tetramethylethylenediamine, etc. Further, as examples of the peroxide, there may be mentioned, ammonium or potassium peroxodisulfate, hydrogen peroxide, benzoyl peroxide, lauroyl peroxide, octanoyl peroxide, succinic peroxide, and tert-butyl peroxy-2-ethylhexanoate.

In the water-soluble ionic polymer dispersion, which is produced by polymerizing an adequate monomer or monomers in the presence of a polyalkylenimine and/or a modified polyalkylenimine, the monomer represented by one of the above general formulas (1) to (3) is supposed to be bound to part of the polyalkylenimine and/or modified polyalkylenimine in the manner of graft polymerization. Further, the polyalkylenimine and/or modified polyalkylenimine has a highly branched structure and, therefore, is thought to be susceptible to graft polymerization and presumably contributes greatly to the stabilization of the dispersion, hence is a material very suited for use as a dispersing agent on the occasion of polymerization.

It is also preferable, in producing the water-soluble ionic polymer dispersion of the invention, to carry out the polymerization in the presence of another water-soluble cationic polymer with a relatively low molecular weight in addition to the polyalkylenimine and/or modified polyalkylenimine. Such water-soluble cationic polymer is a polymer or copolymer of one or more cationic monomers represented by the above general formula (1) and/or the above general formula (2). Also usable are copolymers of one or more of the above-mentioned cationic monomers and a water-soluble nonionic monomer. These water-soluble cationic polymers are added in the step of polymerization or after polymerization. The water-soluble cationic polymers to be added in the step of polymerization or after polymerization have a molecular weight of 1,000 to 3,000,000, preferably 10,000 to 2,000,000.

The water-soluble polymer of the invention can be added to paper stuff before papermaking for the pretreatment of waste paper- or mechanical pulp-derived pitch species and anionic substances. Conceivable as the sites of addition are the mixing chest where various pulp species are mixed together and so forth. Direct addition to raw material pulp, which is the major cause of contamination, may produce marked effects in certain instances. Therefore, as examples of the site of addition, there may be mentioned the very chest for raw material pulp to be treated and the raw material pulp chest piping outlet, among others. However, the sites of addition are not always limited to those mentioned above since it is necessary to determine the sites of addition which are most suited for the respective papermaking plants.

The level of addition of the water-soluble polymer of the invention to paper stuff may vary depending on the cation demand of the paper stuff. Generally, it is about 0.01-0.5% by mass, preferably 0.02-0.2% by mass, most preferably 0.03-0.1% by mass on the pure polymer mass basis relative to the mass of dry paper stuff.

The level of addition of the water-soluble cationic polymer is determined by measuring the cation demand of paper stuff using a Mewtech's model PCD-03 apparatus, for instance. For example, the polymer dispersion of the invention is added to the paper stuff to be used and, after stirring treatment, the stuff is filtered through Whatman No. 41 filer paper, and the cation demand and turbidity of the filtrate are measured. The point at which the turbidity shows a maximum decrease is supposedly a standard for the proper addition level. However, no correct judgment can be made without actual application to the papermaking plant in question.

The method of using the dispersion as a freeness improving agent is now described.

In the water-soluble polymer dispersion of the invention, which is produced by carrying out the polymerization of an appropriate monomer or monomers in the presence of a polyalkylenimine and/or a modified polyalkylenimine, there coexists the polyalkylenimine type polymer, which is markedly effective as a freeness improving agent. However, such polyalkylenimine type polymer is low in degree of polymerization and, therefore, is weak in flocculating activity and, as a result, it is disadvantageous in that the level of addition thereof should be increased. In this connection, the high-molecular-weight polymer in the water-soluble polymer dispersion of the invention counterbalances the disadvantage and improves the performance. The polyalkylenimine type polymer is effective in neutralizing the electric charges on fine fibers, pitch and anionic components, while the coexisting high-molecular-weight polymer is effective in causing flocculation owing to adsorption due to crosslinks to thereby improve the freeness. As for the sites of addition, those sites closer to the papermaking machine are more efficient and, thus, a site before the fan pump, and the screen inlet or outlet, for instance, may be mentioned.

As for the pH in papermaking at which the method of producing an improvement in freeness according to the invention can be applied, the method produces marked effects in acidic papermaking to neutral papermaking as compared with other methods of treatment. Therefore, the method has its merit in papermaking at a pH within the range of 4.0 to 9.0. The target paper products include, among others, high quality or medium quality printing paper, corrugating medium, liner, and paperboard such as white lined chipboard.

The water-soluble polymer dispersion of the invention produces a marked effect in sizing agent fixation as well, since it is produced by polymerizing an appropriate monomer or monomers in the presence of a polyalkylenimine and/or a modified polyalkylenimine.

Thus, since size particles are colloidal particles, they can hardly be fixed by means of a polymer with a high degree of polymerization. In this respect, the polyalkylenimine and/or modified polyalkylenimine is low in degree of polymerization and high in cation equivalent value, hence is suited for the fixation of such fine colloidal particles. Further, the coexisting water-soluble polymer causes flocculation of pulp together with size particles fixed on pulp fibers and thus improves the yield on the wire cloth. The sizing agent coexisting in paper making raw material includes rosin sizing agent for acidic or neutral papermaking. alkylketene dimers and alkenylsuccinic anhydrides, among others. As for the sites of addition, a site before the machine chest or fan pump is suitable. The addition level is 0.005 to 0.3%, preferably 0.01 to 0.2%, on the mass basis relative to dry paper making raw material.

Furthermore, the water-soluble polymer dispersion of the invention can be used also for the purpose of improving the yield by adding the same to paper stuff before papermaking. It is also possible to use the same in combination with an inorganic or organic anionic substance. The anionic substance includes such inorganic materials as bentonite, kaolin, clay and talc, among others. Colloidal silica can also be used.

When the anionic substance is a water-soluble anionic polymer, the water-soluble anionic polymer can be used in any product form. Thus, the product form includes aqueous solutions, powders, water-in-oil emulsions, and dispersed polymers in aqueous salt solutions, for instance. The dispersed polymers in aqueous salt solutions are preferred, however.

The water-soluble anionic polymer composition can be produced by polymerizing, by the conventional method of polymerization, a monomer mixture comprising 3 to 100 mole percent of an anionic monomer represented by the general formula (3) given hereinabove and 0-97 mole percent of a water-soluble nonionic monomer. Specific examples of such anionic monomer and of such water-soluble nonionic monomer, which are to be used, are the same as those described hereinabove. The water-soluble anionic polymer has a mass average molecular weight of 3,000,000 to 20,000,000, preferably 5,000,000 to 15,000,000.

The above-mentioned dispersed polymers in aqueous salt solutions each is a dispersion of a water-soluble anionic polymer in fine particle form with a particle size of not greater than 100 μm as produced by dispersion polymerization of a monomer mixture comprising 3 to 100 mole percent of an anionic monomer represented by the general formula (3) given hereinabove and 0 to 97 mole percent of a water-soluble nonionic monomer in an aqueous salt solution in the presence of a polymer dispersant soluble in the aqueous salt solution.

As for the method of production thereof, this polymer can be produced as described in the above-cited Japanese Kokai Publication S61-123610 or H05-32722. In this case, an anionic polymer is preferably used as the polymer dispersant. Examples thereof are (co)polymers of an anionic monomer, such as acrylamido-2-methylpropanesulfonic acid (or a salt thereof) or styrenesulfonic acid (or a salt thereof). It is also possible to use copolymers of such an anionic monomer and a carboxyl group-containing monomer, such as acrylic acid, methacrylic acid or itaconic acid. Copolymers with acrylamide, which is a nonionic monomer, can also be used.

In the case of use as a yield aid, the addition level is 0.005 to 0.1% by mass, preferably 0.01 to 0.05% by mass, relative to dry paper stuff. In the case of combined use with a water-soluble anionic polymer, the level of addition of the water-soluble anionic polymer is 0.005 to 0.1% by mass, preferably 0.01 to 0.05% by mass. In certain cases, an inorganic anionic substance and an organic anionic substance may be used in combination.

The water-soluble polymer dispersion of the invention can be used in dewatering organic sludge, for example excess sludge resulting from biological treatment of waste water discharged from papermaking plants, chemical plants, food processing plants and the like, or raw sludge, mixed raw sludge, excess sludge, digested sludge and the like from city sewage, or paper mill-derived sludge. The dewatering treatment can be carried out by combined use with a water-soluble anionic polymer.

Although the water-soluble anionic polymer can be used in any product form, the above-mentioned polymer dispersion in an aqueous salt solution is preferred. The composition of the water-soluble anionic polymer is similar to that of the yield aid mentioned above. The molecular weight is 3,000,000 to 20,000,000, preferably 5,000,000 to 15,000,000, as expressed in terms of mass average molecular weight.

When the water-soluble polymer dispersion of the invention is used alone in dewatering treatment, it is used in an amount of 0.01 to 2% by mass, preferably 0.05 to 1.0% by mass, on the pure water-soluble polymer basis relative to solid content of sludge or paper mill-derived sludge. When it is used in combination with a water-soluble anionic polymer, it is used in an amount of 0.01 to 1.0% by mass, preferably 0.05 to 0.5% by mass, on the pure water-soluble polymer basis relative to solid content of sludge or paper mill-derived sludge. On that occasion, the level of addition of the water-soluble anionic polymer is 0.05 to 1.0% by mass, preferably 0.01 to 0.05% by mass. In certain cases, an inorganic flocculant may further be used.

BEST MODES FOR CARRYING OUT THE INVENTION

The following working examples and comparative examples are further illustrative of the present invention. They are, however, by no means limitative of the scope of the invention unless the spirit of the invention is violated.

EXAMPLE 1

A reaction vessel equipped with a stirrer and a temperature control system was charged with a solution prepared by dissolving 50 parts of a 50% (by mass) aqueous solution of polyethylenimine (mass average molecular weight: 50,000) in 21.5 g of deionized water, and the pH was adjusted to 4.8-5.5 by adding 28.5 parts of 75% (by mass) sulfuric acid with cooling and stirring. A reaction vessel equipped with a stirrer, a nitrogen inlet tube and a temperature control system was charged with 120.0 g of the aqueous solution of polyethylenimine as prepared by the above neutralization procedure, followed by addition of 75.0 g of an 80% (by mass) aqueous solution of methacryloyloxyethyltrimethylammonium chloride, 12.0 g of sodium chloride and 93.0 g of deionized water, further followed by stirring. While substituting the reaction vessel atmosphere with nitrogen, a 10% (by mass) aqueous solution of 2,2'-azobis(N,N'-dimethyleneisobutyramidine)dihydrochloride was added as a polymerization initiator in an amount of 0.05% by mass relative to the monomer, and the polymerization was carried out at 36° C. with stirring for 18 hours.

As a result, a polymer dispersion containing fine polymer particles with a particle size of 10-100 μm was obtained (sample 1). The polymer dispersion formed was measured for viscosity using a type B viscometer, and the mass average molecular weight was determined by the static light scattering method using a molecular weight measuring apparatus (Otsuka Electronics model DLS-7000). The composition is shown in Table 1, and the measurement results are shown in Table 2.

EXAMPLES 2 TO 6

Following the procedure mentioned above in Example 1, the monomer compositions specified in Table 1 each was charged into the reaction vessel to attain the monomer concentration specified in Table 1 and the polymerization procedure was carried out. Water-soluble polymer dispersions were thus obtained (sample 2 to sample 6). The compositions are shown in Table 1, and the measurement results in Table 2.

EXAMPLE 7

A reaction vessel equipped with a stirrer and a temperature control system was charged with a solution prepared by dissolving 50 parts of a 50% (by mass) aqueous solution of polyethylenimine (mass average molecular weight: 50,000) in 21.5 g of deionized water, and the pH was adjusted to 4.8-5.5 by adding 28.5 parts of 75% (by mass) sulfuric acid with cooling and stirring. A reaction vessel equipped with a stirrer, a nitrogen inlet tube and a temperature control system was charged with 120.0 g of the aqueous solution of polyethylenimine as prepared by the above neutralization procedure, followed by addition of 75.0 g of an 80% (by mass) aqueous solution of methacryloyloxyethyltrimethylammonium chloride and 105.0 g of deionized water, further followed by stirring. While substituting the reaction vessel atmosphere with nitrogen, a 10% (by mass) aqueous solution of 2,2'-azobis(N,N'-dimethyleneisobutyramidine)dihydrochloride was added as a polymerization initiator in an amount of 0.05% by mass relative to the monomer, and the polymerization was carried out at 36° C. with stirring for 18 hours. As a result, a polymer dispersion containing fine polymer particles with a particle size of 10-100 μm was obtained (sample 7). The viscosity of the polymer dispersion and the mass average molecular weight were determined in the same manner as in Example 1. The composition is shown in Table 1, and the measurement results are shown in Table 2.

EXAMPLES 8 TO 12

Following the procedure mentioned above in Example 7, the monomer compositions specified in Table 1 each was charged into the reaction vessel to attain the monomer concentration specified in Table 1 and the polymerization procedure was carried out. Water-soluble polymer dispersions were thus obtained (sample 8 to sample 12). The compositions are shown in Table 1, and the measurement results in Table 2.

EXAMPLE 13

Synthesis Example 1

A four-necked separable flask equipped with a thermometer, a stirrer and a dropping funnel was charged with 146.6 g of epichlorohydrin and 29.6 g of deionized water, 123.8 g of a 50% (by mass) aqueous solution of dimethylamine was added dropwise at 40-45° C. over 2 hours and, after comple tion of the dropping, the reaction was allowed to proceed at 45° C. for 1 hour and, then, 29.6 g of deionized water was added.

Synthesis Example 2

Then, a separable flask equipped with a thermometer and a stirrer was charged with 23.3 g of polyethylenimine (100%; mass average molecular weight: 10,000) and 60.0 g of deionized water and, after stirring, 26.9 g of the polycationic product of Synthesis Example 1 was added, and the reaction was allowed to proceed at 28° C. for 45 minutes. At the time when the reaction mixture showed an increase in viscosity, 4.5 g of 75% (by mass) sulfuric acid was added to terminate the reaction. The mass average molecular weight was measured and found to be 103,000.

A reaction vessel equipped with a stirrer and a temperature control system was charged with 109 g of the polyethylenimine modification prepared in Synthesis Example 2, which was then neutralized to a solution pH of 5.5 with sulfuric acid. Thereafter, the same procedure as in Examples 1-6 was followed to give a polymer dispersion comprising fine particles, namely sample 13. The composition is shown in Table 1, and the measurement results are shown in Table 2.

EXAMPLE 14

A reaction vessel equipped with a stirrer, a nitrogen inlet tube and a temperature control system was charged with 120.0 g of the same neutralized aqueous solution of polyethylenimine as used in Example 1, and then with 30 g of a 60% (by mass) aqueous solution of acrylic acid, 114.0 g of a 50% (by mass) aqueous solution of acrylamide, 15.9 g of sodium chloride and 30.1 g of deionized water, followed by stirring. While substituting the reaction vessel atmosphere with nitrogen, a 10% (by mass) aqueous solution of 2,2'-azobis(N,N'-dimethyleneisobutyramidine) dihydrochloride was added as a polymerization initiator in an amount of 0.05% by mass relative to the monomers, and the polymerization was carried out at 36° C. with stirring for 18 hours. As a result, a polymer dispersion containing fine polymer particles with a particle size of 10-30 μm, namely sample 14, was obtained.

The composition is shown in Table 1, and the measurement results are shown in Table 2.

Comparative Examples 1 to 5

Water-soluble polymer dispersions (comparative samples 1 to 5) were obtained by charging the monomer or monomer composition specified in Table 1 to the monomer concentration specified in Table 1 and carrying out the polymerization procedure in the same manner using, as the water-soluble polymer constituting the dispersion medium on the occasion of polymerization, a dimethylamine/epichlorohydrin reaction product, molecular weight 10,000 (Comparative Example 1), no water-soluble polymer (Comparative Examples 2 and 3), polyethylene glycol #5,000 (Comparative Example 4), or a dimethyldiallylammonium chloride polymer, molecular weight 100,000 (Comparative Example 5).

The compositions are shown in Table 1, and the measurement results in Table 2.

(Synthesis of a Water-Soluble Anionic Polymer Dispersion)

A 500-ml four-necked separable flask equipped with a stirrer, a reflux condenser, a thermometer and a nitrogen inlet tube was charged with 107.7 g of deionized water, 26.8 g of ammonium sulfate, 17.9 g of sodium sulfate, 32.7 g of 60 acrylic acid and 90.3 g of 50% (by mass) acrylamide, and 16 mole percent of the acrylic acid was neutralized with 5.8 g of 30% (by mass) sodium hydroxide. Further, 20 g of a 15% (by mass) aqueous solution of an acrylamido-2-methylpropanesulfonic acid (90 mole percent neutralized) polymer (solution viscosity 14,500 mPa·s) was added. Then, nitrogen was introduced through the nitrogen inlet tube with stirring to eliminate the dissolved oxygen, during which the inside temperature was adjusted to 30° C. by means of a constant temperature water bath. After 30 minutes of nitrogen introduction, 0.6 g of 0.1% (by mass) ammonium peroxodisulfate and 0.6 g of a 0.1% (by mass) aqueous solution of ammonium hydrogen sulfite were added in that order to initiate the polymerization. At 3 hours after initiation of the polymerization, the same amounts of the above initiators were added and, further, 6 hours later, the initiators were added each in an amount of 3.0 g. After 15 hours, the reaction procedure was finished. The sample thus obtained is referred to as "sample A". In this sample A, the acrylic acid/acrylamide mole ratio was 30:70, and the viscosity was 470 mPa·s. Microscopic observation revealed that the particles had a size of 5-20 μm. The mass average molecular weight was 8,000,000.

(Synthesis of a Water-Soluble, Cationic Polymer Dispersion)

A five-necked separable flask equipped with a stirrer, a thermometer, a reflux condenser and a nitrogen inlet tube was charged with 21.0 g of a dimethyldiallylammonium chloride polymer (30% (by mass) aqueous solution, molecular weight 200,000) (5.0% by mass on the monomer basis), 178.1 g. of deionized water, 115.0 g of ammonium sulfate, 67.4 g of a 50% (by mass) aqueous solution of acrylamdie and 115.0 g of a 80% (by mass) aqueous solution of acryloyloxyethyltrimethylammonium chloride, and complete dissolution was attained. The inside temperature was maintained at 33-35° C. and, after 30 minutes of nitrogen substitution, 2.5 g (0.04% by mass on the monomer basis) of a 10% (by mass) aqueous solution of 2,2'-azobis[2-(5-methyl-2-imidazolin-2-yl)propane]dihydrochloride was added as an initiator to thereby initiate the polymerization. At 2.5 hours after initiation, a slight increase in viscosity was observed but the viscosity increase soon subsided. The mixture turned into a dispersion. At 8 hours after initiation, 1.3 g of the above initiator solution was added, and the polymerization was further allowed to proceed for 8 hours. The monomers charged amounted to a concentration of 25.0% by mass in the dispersion obtained. The polymer particle size was 10 μm or less, and the monomer mole ratio was 50:50. The mass average molecular weight was 6,000,000. This sample is referred to as "sample C".

TABLE 1

| | Monomer composition | | | | Coexisting salt species | Coexisting salt concn. | Monomer concn. | Coexisting polymer mass % |
|---|---|---|---|---|---|---|---|---|
| | AAM | DMC | DMQ | AAC | | | | |
| Example | | | | | | | | |
| 1 | | 100 | | | (a) | 10 | 20 | 25 |
| 2 | | | 100 | | (a) | 15 | 20 | 50 |
| 3 | 20 | 80 | | | (a) | 8 | 20 | 50 |
| 4 | 40 | 60 | | | (c) | 8 | 20 | 50 |
| 5 | 90 | | 10 | | (b) | 10 | 20 | 50 |
| 6 | 60 | 20 | 10 | 10 | (d) | 15 | 20 | 50 |
| 7 | | 100 | | | — | — | 20 | 50 |
| 8 | | | 100 | | — | — | 20 | 65 |
| 9 | 20 | 80 | | | — | — | 20 | 65 |
| 10 | 40 | 60 | | | — | — | 20 | 65 |
| 11 | 90 | | 10 | | — | — | 20 | 65 |
| 12 | 60 | 20 | 10 | 10 | — | — | 20 | 65 |
| 13 | | 100 | | | (a) | 10 | 20 | 50 |
| 14 | 75 | | | 25 | (a) | 15 | 20 | 50 |
| Comparative Example | | | | | | | | |
| 1 | | 100 | | | (a) | 10 | 20 | 50(1 |
| 2 | | 100 | | | (b) | 10 | 20 | 50(2 |
| 3 | | 100 | | | (d) | 10 | 20 | 37.5(3 |
| 4 | 20 | 80 | | | — | — | 20 | 50(3 |
| 5 | 80 | 20 | | | — | — | 20 | 50(3 |

DMC: Methacryloyloxyethyltrimethylammonium chloride
DMQ: Acryloyloxyethyltrimethylammonium chloride
AAC: Acrylic acid
AAM: Acrylamide
(1 Coexisting polymer: dimethylamine/epochlorohydrin reaction product,
(2 Coexisting polymer: polyethylene glycol #5,000
(3 Coexisting polymer: dimethyldiallylammonium chloride polymer,
Coexisting polymer addition level: % on monomer basis
Coexisting salt species: (a) sodium chloride, (b) sodium sulfate, (c) ammonium sulfate, (d) potassium chloride

TABLE 2

| | Sample name | Viscosity of dispersion | Mol. weight |
|---|---|---|---|
| Example | | | |
| 1 | Sample - 1 | 15,000 | 300 |
| 2 | Sample - 2 | 12,500 | 400 |
| 3 | Sample - 3 | 11,000 | 300 |
| 4 | Sample - 4 | 19,000 | 600 |
| 5 | Sample - 5 | 10,200 | 750 |
| 6 | Sample - 6 | 10,700 | 500 |
| 7 | Sample - 7 | 6,200 | 250 |
| 8 | Sample - 8 | 3,000 | 310 |
| 9 | Sample - 9 | 7,000 | 500 |
| 10 | Sample - 10 | 4,500 | 450 |
| 11 | Sample - 11 | 5,500 | 600 |
| 12 | Sample - 12 | 8,000 | 550 |
| 13 | Sample - 13 | 9,150 | 250 |
| 14 | Sample - 14 | 11,500 | 600 |
| Comparative Example | | | |
| 1 | Compar. 1 | 100,000 | 200 |
| 2 | Compar. 2 | Gel-like | 500 |
| 3 | Compar. 3 | 15,000 | 300 |
| 4 | Compar. 4 | 80,000 | 250 |
| 5 | Compar. 5 | 51,000 | 380 |

Viscosity of dispersion; mPa·s Molecular weight; ×10,000

EXAMPLES 15 TO 21

Medium quality paper stuff comprising bleached hardwood kraft pulp, mechanical pulp and deinked waste paper (pH 7.03, total ss 2.20% by mass, ash 0.26% by mass) was used and diluted to a pulp concentration of 0.9% by mass with tap water, and the yield rate was measured using a Brit type dynamic jar tester. First, 2% by mass of liquid aluminum sulfate was added and then 0.02% by mass, relative to the paper stuff, of one of the samples 1-7 was added and, further, 0.015% by mass, relative to the paper stuff, of the water-soluble anionic polymer (sample A) produced as mentioned above (Synthesis of a water-soluble anionic polymer dispersion) was added. The agents were added in the order mentioned above at intervals of 15 seconds under the test conditions mentioned below, and stirring was started. The pH after addition of all the agents was 5.2. After 30 seconds, the white water was discharged and discarded for 10 seconds. Then, the white water was collected for 30 seconds, and the total yield was determined under the following conditions. The stirring conditions were as follows: number of revolutions 1,000 rpm, wire 125P screen (corresponding to 200 mesh). The total yield rate (SS concentration) was determined by filtration through ADVANTEC No. 2. Further, the filter paper was dried and incinerated at 800° C., the ash was weighed, and the inorganic matter yield rate was calculated. The results of the above measurements are shown in Table 3.

Comparative Examples 6 to 11

For comparison, tests were carried out following the same procedure as in Examples 15-21 except that the comparative samples 1 to 5 and the water-soluble cationic polymer (sample C) produced as mentioned above in Synthesis Example 2 were used and that the water-soluble anionic polymer (sample A) produced as mentioned above (Synthesis of a water-soluble anionic polymer dispersion) was added in an amount of 0.015% by mass relative to the paper stuff. The measurement results are shown in Table 3.

TABLE 3

| | Sample name and addition level | | | | Inorganic matter yield |
|---|---|---|---|---|---|
| | Sample name | Addition level | Anionic polymer | Total yield | |
| Example | | | | | |
| 15 | Sample - 1 | 0.02 | 0.015 | 62.2 | 51.7 |
| 16 | Sample - 2 | 0.02 | 0.015 | 63.5 | 52.0 |
| 17 | Sample - 3 | 0.02 | 0.015 | 63.8 | 54.5 |
| 18 | Sample - 4 | 0.02 | 0.015 | 64.7 | 55.2 |
| 19 | Sample - 5 | 0.02 | 0.015 | 61.3 | 52.7 |
| 20 | Sample - 6 | 0.02 | 0.015 | 64.5 | 55.8 |
| 21 | Sample - 7 | 0.02 | 0.015 | 61.9 | 51.5 |
| Comparative Example | | | | | |
| 6 | Compar. 1 | 0.02 | 0.015 | 57.3 | 48.3 |
| 7 | Compar. 2 | 0.02 | 0.015 | 59.0 | 50.1 |
| 8 | Compar. 3 | 0.02 | 0.015 | 57.5 | 48.5 |
| 9 | Compar. 4 | 0.02 | 0.015 | 56.4 | 49.3 |
| 10 | Compar. 5 | 0.02 | 0.015 | 58.6 | 49.5 |
| 11 | Sample - C | 0.02 | 0.015 | 60.9 | 50.7 |

Total yield: % by mass;
inorganic matter yield: % by mass.

EXAMPLES 22 TO 27

Paper stuff for manufacturing fine quality paper (LBKP-based paper stuff, pH 6.10, total ss 2.4% by mass, ash 0.40% by mass), which was used as the sample, was diluted to a pulp concentration of 0.9% by mass using tap water, and the yield rate was measured using a Brit type dynamic jar tester. The additives used were 0.5% by mass, relative to the paper stuff, of cationic starch, 20% by mass of light-weight calcium carbonate, 0.2% by mass of neutral rosin size, 1.0% by mass of aluminum sulfate, and 0.025% by mass of each of the samples 9 to 14 specified above in Table 2. They were added in the order described at intervals of 15 seconds, and stirring was started. The pH after addition of all the agents was 6.6. After 30 seconds, the white water was discharged and discarded for 10 seconds. Then, the white water was collected for 30 seconds, and the total yield was determined under the following conditions. The stirring conditions were as follows: number of revolutions 1,000 rpm, wire 125P screen (corresponding to 200 mesh). The total yield rate (SS concentration) was determined by filtration through ADVANTEC No. 2. Further, the filter paper was dried and incinerated at 600° C., the ash was weighed, and the calcium carbonate yield rate was calculated. The results are shown in Table 4.

Comparative Examples 12 to 15

For comparison, tests were carried out following the same procedure as in Examples 22-27 using the comparative samples 3 to 5 and the water-soluble cationic polymer (sample C) produced as mentioned above in Synthesis Example 2. The measurement results are shown in Table 4.

TABLE 4

| | Sample name and addition level | | | Calcium carbonate yield |
|---|---|---|---|---|
| | Sample name | Addition level | Total yield | |
| Example | | | | |
| 22 | Sample - 9 | 0.025 | 70.6 | 52.7 |
| 23 | Sample - 10 | 0.025 | 72.8 | 55.6 |
| 24 | Sample - 11 | 0.025 | 71.2 | 53.8 |
| 25 | Sample - 12 | 0.025 | 72.2 | 55.5 |
| 26 | Sample - 13 | 0.025 | 74.3 | 57.1 |
| 27 | Sample - 14 | 0.025 | 71.0 | 53.2 |
| Comparative Example | | | | |
| 12 | Compar. 3 | 0.025 | 64.8 | 49.0 |
| 13 | Compar. 4 | 0.025 | 65.7 | 49.5 |
| 14 | Compar. 5 | 0.025 | 68.1 | 50.5 |
| 15 | Sample - C | 0.025 | 69.5 | 52.1 |

Total yield: % by mass;
Calcium carbonate yield: % by mass.

EXAMPLES 28 TO 33

Paper stuff for medium quality paper manufacture comprising mechanical pulp, LBKP and waste dodgers (pH 5.82, turbidity 1,250 FAU, total ss 3.05% by mass, ash 0.25% by mass, cation demand 0.715 meq/L, zeta potential 9 mV) was used, and the paper stuff was subjected to pretreatment testing. Thus, 100 mL of the stuff was taken and placed in a stirrer. The samples 1 to 3, 7, 8 and 13 specified above in Table 2 were respectively added in an amount of 0.03% by mass relative to the ss, and each mixture was stirred at 500 revolutions per minute for 60 seconds. Then, the whole mixture was filtered through Whatman No. 41 (90 mm) filter paper, and the cation demand of the filtrate was determined using Mewtech's model PCD-03 apparatus and the turbidity was measured using a HACH model DR2100P turbidimeter. The measurement results are shown in Table 5.

Comparative Examples 16 to 20

For comparison, tests were carried out following the same procedure as in Examples 28 to 33 using a polycondensate type cationic polymer [dimethylamine/epichlorohydrin/polyamine reaction product (molecular weight: 15,000, cation equivalent: 7.51 meq/g)] (comparative sample 6) and the comparative samples 1 to 4 specified above in Table 2. The measurement results are shown in Table 5.

TABLE 5

| | Sample name | Cation demand of filtrate after treatment | Turbidity of filtrate after treatment |
|---|---|---|---|
| Example | | | |
| 28 | Sample - 1 | 0.058 | 160 |
| 29 | Sample - 2 | 0.066 | 210 |
| 30 | Sample - 3 | 0.075 | 180 |
| 31 | Sample - 7 | 0.055 | 135 |
| 32 | Sample - 8 | 0.065 | 210 |
| 33 | Sample - 13 | 0.058 | 150 |

TABLE 5-continued

| | Sample name | Cation demand of filtrate after treatment | Turbidity of filtrate after treatment |
|---|---|---|---|
| Comparative Example | | | |
| 16 | Compar. 1 | 0.115 | 320 |
| 17 | Compar. 2 | 0.094 | 250 |
| 18 | Compar. 3 | 0.102 | 250 |
| 19 | Compar. 4 | 0.120 | 450 |
| 20 | Compar. 6 | 0.107 | 280 |

Filtrate cation demand: meq/L, Filtrate turbidity: FAU

EXAMPLES 34 TO 39

Paper stuff for high quality paper manufacture (LBKP-based paper stuff, pH 6.10, total ss 2.4% by mass, ash 0.40% by mass) was used and diluted to a pulp concentration of 0.7% by mass with tap water. Using this paper stuff, paper was made with a basis weight of 80 g/m². As for the additives, 0.2% by mass of cationic starch, 0.25% by mass (on the dry pulp basis; hereinafter the same shall apply) of neutral rosin size, 1.0% by mass of aluminum sulfate, 0.03% by mass of one of the samples 1 to 6 specified above in Table 2, and 0.01% by mass of the water-soluble cationic polymer (sample C) as a yield aid were added in that order at intervals of 15 seconds with stirring at 300 rpm with a stirrer and, then, paper was made on a TAPPI standard sheet machine. The pH after addition of all the agents was around 6.8. The wet paper obtained was pressed at 3.5 Kg/m² for 5 minutes and dried at 100° C. for 2 minutes. The paper was then conditioned at 20° C. and 65RH and measured for tensile strength, the breaking length was calculated (JIS P 8113), and the Stöckigt sizing degree (JIS P 8122) and ash content (residue after 1 hour of ignition at 800° C.) were measured. The measurement results are shown in Table 6.

Comparative Examples 21 to 24

For comparison, papermaking and measurements were carried out following the same procedure as in Examples 34 to 39 and using the comparative samples 3 to 5 and the polycondensate type cationic polymer [dimethylamine/epichlorohydrin/polyamine reaction product (molecular weight: 15,00, cation equivalent: 7.51 meq/g)] (comparative sample 6). The measurement results are shown in Table 6.

TABLE 6

| | Sample name | Stöckigt sizing degree | Breaking length | Ash in paper |
|---|---|---|---|---|
| Example | | | | |
| 34 | Sample - 1 | 17.2 | 6.2 | 3.7 |
| 35 | Sample - 2 | 15.0 | 5.4 | 3.8 |
| 36 | Sample - 3 | 19.0 | 6.5 | 3.9 |
| 37 | Sample - 4 | 14.5 | 5.4 | 3.8 |
| 38 | Sample - 5 | 13.7 | 5.2 | 3.7 |
| 39 | Sample - 6 | 15.3 | 5.5 | 3.7 |
| Comparative Example | | | | |
| 21 | Compar. 3 | 14.0 | 5.0 | 3.6 |
| 22 | Compar. 4 | 12.5 | 4.7 | 3.5 |

TABLE 6-continued

| | Sample name | Stöckigt sizing degree | Breaking length | Ash in paper |
|---|---|---|---|---|
| 23 | Compar. 5 | 12.7 | 4.5 | 3.4 |
| 24 | Compar. 6 | 11.2 | 4.0 | 3.0 |

Stöckigt sizing degree: seconds, breaking length: Km, ash in paper: % by mass.

EXAMPLES 40 TO 47

Crushed news were disintegrated to give a 2% (by mass) dispersion, followed by beating to a Canadian standard freeness (CSF) value of 180 mL. This dispersion was diluted to 0.4% by mass, and the dilution was subjected to freeness testing. The 0.4% (by mass) dispersion prepared was placed in a 1,000-mL measuring cylinder, 2.0% by mass of liquid aluminum sulfate was added, the resulting mixture was stirred by inverting the measuring cylinder 5 times, 0.03% by mass, relative to the dry waste paper mass, of one of the samples 7 to 14 specified above in Table 2 was added, and the mixture was further stirred by inverting the measuring cylinder 5 times and then charged into a CSF tester for freeness measurement. Thereafter, the pulp remaining on the mesh of the CSF tester was transferred to a double-bottomed centrifuge tube with a 100-mesh filter cloth spread on the bottom, and the pulp was dewatered using a digital centrifugal machine at 3,000 rpm for 5 minutes (a dewatering couch roll on a papermaking machine being imagined). The mass of the dewatered pulp was measured and, after 20 hours of drying at 105° C., the mass was again measured. Then, the pulp was ignited at 800° C. for 2 hours, and the ash yield rate was determined by measuring the mass of the inorganic matter. The measurement results are shown in Table 7.

Comparative Examples 25 to 28

For comparison, tests were carried out in the same manner as in Examples 40-47 except that the comparative samples 3 to 5 specified above in Table 2 were used. At the same time, polyethylenimine (molecular weight: 50,000) (comparative sample 7) was also subjected to testing in the same manner as in Examples 40-47. The measurement results are shown in Table 7.

TABLE 7

| | Sample name | Freeness | Water content in pulp | Inorganic matter yield |
|---|---|---|---|---|
| Example | | | | |
| 40 | Sample - 7 | 220 | 53.4 | 75.1 |
| 41 | Sample - 8 | 240 | 53.5 | 75.5 |
| 42 | Sample - 9 | 250 | 53.0 | 76.0 |
| 43 | Sample - 10 | 270 | 52.3 | 77.5 |
| 44 | Sample - 11 | 250 | 53.0 | 76.1 |
| 45 | Sample - 12 | 250 | 52.9 | 75.7 |
| 46 | Sample - 13 | 230 | 53.7 | 75.0 |
| 47 | Sample - 14 | 250 | 52.7 | 76.0 |
| Comparative Example | | | | |
| 25 | Compar. 3 | 200 | 54.8 | 71.4 |
| 26 | Compar. 4 | 210 | 54.5 | 71.5 |
| 27 | Compar. 5 | 230 | 54.0 | 74.2 |
| 28 | Compar. 7 | 210 | 54.1 | 72.6 |

Freeness: mL, water content in pulp: % by mass, ash yield: % by mass.

EXAMPLES 48 TO 55

Chemical plant-derived excess sludge was used as the test water (analytical values: pH 6.94, total ss 23, 150 mg/L). A 200-mL portion of the sludge was placed in a plastic beaker, 0.3% by mass, relative to the sludge solid matter, of one of the samples 1 to 6 specified above in Table 2 was added, each mixture was stirred by 10 repetitions of beaker-to-beaker transfer and then filtered through a T-1179L filter cloth (made of nylon), and the amount of filtrate after 30 seconds was measured. Further, the sludge after filtration was dewatered at a press pressure of 2 Kg m² for 1 minute. Then, the cake was checked for peelability from the filter cloth by visual observation, and the water content in cake (20 hours of drying at 105° C.) was measured. The measurement results are shown in Table 8.

Comparative Examples 29 to 32

Tests were carried out in the same manner as in Examples 48 to 55 using the comparative samples 3 to 5 specified above in Table 2 and a cationic polymer flocculant powder (methacryloyloxyethyltrimethylammonium chloride/acrylamide=40/60 mole percent copolymer, molecular weight: 7,000,000) (comparative sample 8). The measurement results are shown in Table 8.

TABLE 8

| | Sample name | Filtrate amount after 30 seconds | Peelability from filter cloth | Water content in cake |
|---|---|---|---|---|
| Example | | | | |
| 48 | Sample - 7 | 160 | A | 78.3 |
| 49 | Sample - 8 | 155 | A | 78.8 |
| 50 | Sample - 9 | 170 | A | 76.7 |
| 51 | Sample - 10 | 170 | A | 77.2 |
| 52 | Sample - 11 | 155 | A | 78.9 |
| 53 | Sample - 12 | 165 | A | 77.0 |
| 54 | Sample - 13 | 160 | A | 78.5 |
| 55 | Sample - 14 | 160 | A | 77.1 |
| Comparative Example | | | | |
| 29 | Compar. 3 | 140 | B | 79.9 |
| 30 | Compar. 4 | 135 | C | 81.1 |
| 31 | Compar. 5 | 130 | C | 82.2 |
| 32 | Compar. 8 | 155 | A | 79.0 |

Filtrate amount after 30 seconds: ml, water content in cake: % by mass, peelability from filter cloth: better in the order A > B > C.

EXAMPLES 56 TO 62

Food processing plant-derived excess sludge was used as the test water (analytical values: pH 6.49, total ss 22, 300 mg/L). A 200-mL portion of the sludge was placed in a plastic beaker, 0.3% by mass, relative to the sludge solid matter, of one of the samples 1 to 6 specified above in Table 2 was added, and each mixture was stirred by 10 repetitions of beaker-to-beaker transfer. Then, 0.15% by mass, relative to the sludge solid, of the water-soluble anionic polymer (sample A) produced as mentioned above (Synthesis of a water-soluble anionic polymer dispersion) was added, and the mixture was stirred by 10 repetitions of beaker-to-beaker transfer and, then, filtered through a T-1179L filter cloth (made of nylon), and the amount of filtrate after 30 seconds was measured. Further, the sludge after filtration was dewatered at a press pressure of 2 Kg m² for 1 minute. Then, the cake was checked for peelability from the filter cloth by visual observation, and the water content in cake (20 hours of drying at 105° C.) was measured. The measurement results are shown in Table 9.

Comparative Examples 33 to 37

Tests were carried out in the same manner as in Examples 56-62 using the comparative samples 3 to 5 specified above in Table 2, a cationic polymer flocculent powder (methacryloyloxyethyltrimethylammonium chloride polymer, molecular weight: 5,000,000) (comparative sample 9), and the water-soluble cationic polymer (sample C) produced as described above (Synthesis of a water-soluble cationic polymer dispersion), each in combination with the water-soluble anionic polymer (sample A) produced as described above (Synthesis of a water-soluble anionic polymer dispersion). The measurement results are shown in Table 9.

TABLE 9

| | Sample name and addition level | | Anionic polymer | Filtrate amount after 30 seconds | Peelability from filter cloth | Water content in cake |
|---|---|---|---|---|---|---|
| Example | | | | | | |
| 56 | Sample - 7 | 0.3 | 0.15 | 165 | A | 79.8 |
| 57 | Sample - 8 | 0.3 | 0.15 | 160 | A | 80.5 |
| 58 | Sample - 9 | 0.3 | 0.15 | 160 | A | 80.5 |
| 59 | Sample - 10 | 0.3 | 0.15 | 155 | A | 80.9 |
| 60 | Sample - 11 | 0.3 | 0.15 | 150 | A | 81.2 |
| 61 | Sample - 12 | 0.3 | 0.15 | 160 | A | 80.0 |
| 62 | Sample - 13 | 0.3 | 0.15 | 165 | A | 79.9 |
| Comparative Example | | | | | | |
| 33 | Compar. 3 | 0.3 | 0.15 | 145 | B | 82.4 |
| 34 | Compar. 4 | 0.3 | 0.15 | 150 | B | 82.9 |
| 35 | Compar. 5 | 0.3 | 0.15 | 140 | C | 73.5 |
| 36 | Compar. 8 | 0.3 | 0.15 | 155 | A | 81.6 |
| 37 | Sample - C | 0.3 | 0.15 | 145 | A | 81.9 |

Peelability from filter cloth: better in the order A > B > C.
Filtrate amount after 30 seconds: ml, water content in cake: % by mass.

EXAMPLES 63 TO 68

Papermaking plant-derived sludge (pH 6.05, total ss 25,500 mg/L) was used as the test water and subjected to dewatering testing. A 200 ml portion of the sludge was placed in a plastic beaker, 0.15% by mass, relative to the dry solid matter, of one of the samples 5, 6, 9, 10, 12 and 14 specified above in Table 2 was added, each mixture was stirred by 10 repetitions of beaker-to-beaker transfer and then filtered through a T-1179L filter cloth (made of nylon), and the amount of filtrate after 30 seconds was measured. Further, the sludge after filtration was dewatered at a press pressure of 4 Kg m² for 1 minute. Then, the cake was checked for peelability from the filter cloth, and the water content in cake (20 hours of drying at 105° C.) was measured. The measurement results are shown in Table 10.

Comparative Examples 38 to 40

Tests were carried out in the same manner as in Examples 63-68 using the comparative samples 4 and 5 specified above in Table 2 and a cationic polymer flocculant (acryloyloxyethyltrimethylammonium chloride/acrylamide=20/80 (mole percent) copolymer, molecular weight: 7,500,000) (comparative sample 10). The measurement results are shown in Table 10.

TABLE 10

| | Sample name | Filtrate amount after 30 seconds | Peelability from filter cloth | Water content in cake |
|---|---|---|---|---|
| Example | | | | |
| 63 | Sample - 5 | 175 | A | 78.3 |
| 64 | Sample - 6 | 175 | A | 78.8 |
| 65 | Sample - 9 | 165 | A | 76.7 |
| 66 | Sample - 10 | 170 | A | 77.2 |
| 67 | Sample - 12 | 175 | A | 78.9 |
| 68 | Sample - 14 | 165 | A | 77.0 |
| Comparative Example | | | | |
| 38 | Compar. 4 | 150 | B | 79.9 |
| 39 | Compar. 5 | 160 | A | 81.1 |
| 40 | Compar. 10 | 165 | A | 82.2 |

Filtrate amount after 30 seconds: ml, water content in cake: % by mass.
Peelability from filter cloth: better in the order A > B > C.

EXAMPLES 69 TO 74

The same paper mill-derived sludge (pH 6.05, total ss 25,500 mg/L) as used in Examples 63-68 was used and subjected to dewatering testing. A 200 ml portion of the sludge was placed in a plastic beaker, 0.15% by mass, relative to the sludge solid matter, of one of the samples 1, 2, 4, 7, 10 and 13 specified above in Table 2, and each mixture was stirred by 10 repetitions of beaker-to-beaker transfer. Then, 0.1% by mass, relative to the sludge solid matter, of the water-soluble anionic polymer (sample A) produced as mentioned above (Synthesis of a water-soluble anionic polymer dispersion) was added, and the mixture was stirred by 10 repetitions of beaker-to-beaker transfer and, then, filtered through a T-1179L filter cloth (made of nylon), and the amount of filtrate after 30 seconds was measured. Further, the sludge after filtration was dewatered at a press pressure of 2 Kg m² for 1 minute. Then, the cake was checked for peelability from the filter cloth by visual observation, and the water content in cake (20 hours of drying at 105° C.) was measured. The measurement results are shown in Table 11.

Comparative Examples 41 to 45

Tests were carried out in the same manner as in Examples 69-74 using the comparative samples 1 to 3 specified above in Table 2, the above-mentioned cationic polymer flocculent powder (methacryloyloxyethyltrimethylammonium chloride polymer, molecular weight: 5,000,000) (comparative sample 9), and the water-soluble cationic polymer (sample C) produced as described above (Synthesis of a water-soluble cationic polymer dispersion), each in combination with the water-soluble anionic polymer (sample A) produced as described above (Synthesis of a water-soluble anionic polymer dispersion). The measurement results are shown in Table 11.

TABLE 11

| | Sample name and addition level | | Anionic polymer | Filtrate amount after 30 seconds | Peelability from filter cloth | Water content in cake |
|---|---|---|---|---|---|---|
| Example | | | | | | |
| 69 | Sample - 1 | 0.15 | 0.1 | 175 | A | 67.6 |
| 70 | Sample - 2 | 0.15 | 0.1 | 170 | A | 68.3 |
| 71 | Sample - 4 | 0.15 | 0.1 | 170 | A | 68.9 |
| 72 | Sample - 7 | 0.15 | 0.1 | 175 | A | 67.9 |
| 73 | Sample - 10 | 0.15 | 0.1 | 165 | A | 69.1 |
| 74 | Sample - 13 | 0.15 | 0.1 | 175 | A | 67.7 |
| Comparative Example | | | | | | |
| 41 | Compar. 1 | 0.15 | 0.1 | 155 | B | 71.2 |
| 42 | Compar. 2 | 0.15 | 0.1 | 155 | B | 70.3 |
| 43 | Compar. 3 | 0.15 | 0.1 | 155 | B | 71.0 |
| 44 | Compar. 9 | 0.15 | 0.1 | 165 | A | 69.8 |
| 45 | Sample - C | 0.15 | 0.1 | 160 | A | 70.4 |

Filtrate amount after 30 seconds: ml, water content in cake: % by mass.
Peelability from filter cloth: better in the order A > B > C.

INDUSTRIAL APPLICABILITY

The water-soluble polymer dispersion of the invention can be produced with ease in a dispersion form by the production method of the invention. The thus-obtained water-soluble polymer dispersion of the invention is excellent in storage stability, shows good fluidity and solubility and can be added to paper stuff before papermaking for the pretreatment thereof to thereby improve the freeness, sizing degree and yield. It can also be added to organic sludge or paper mill-derived sludge to promote dewatering treatment following flocculation. Its industrial utility is thus very great.

The invention claimed is:

1. A water-soluble polymer dispersion in which a water-soluble polymer having at least one type of ionicity selected from among cationicity and amphotericity and occurring in the form of fine particles with a particle size of not greater than 100 μm and a polyalkylenimine in the sulfate salt form coexist, wherein the polymer is produced by dispersion polymerization of a monomer (or monomer mixture) comprising 5 to 100 mole percent of a monomer represented by the general formula (1) and/or (2) given below, 0 to 50 mole percent of a monomer represented by the general formula (3) given below and 0 to 95 mole percent of a water-soluble nonionic monomer with stirring in the presence of said polyalkylenimine in the sulfate salt form;

General formula (1)

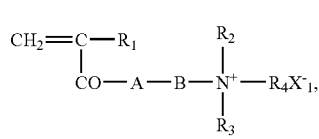

wherein the general formula (1), $R_1$ is a hydrogen atom or a methyl group, $R_2$ and $R_3$ may be the same or different and each is an alkyl or an alkoxy group containing 1 to 3 carbon atoms or a benzyl group, $R_4$ is a hydrogen atom, an alkyl or alkoxy group containing 1 to 3 carbon atoms or a benzyl group. A represents an oxygen atom or NH, B represents an alkylene or an alkoxylene group containing 2 to 4 carbon atoms, and $X_1$ represents a sulfate anion;

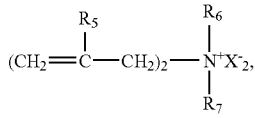

General formula (2)

wherein the general formula (2), $R_5$ represents a hydrogen atom or a methyl group, $R_6$ and $R_7$ each represents an alkyl or an alkoxy group containing 1 to 3 carbon atoms or a benzyl group, and $X_2$ represents a sulfate anion;

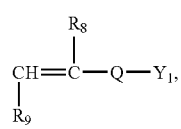

General formula (3)

wherein the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or $COO$, $R_9$ represents a hydrogen atom or $COOY_2$, and $Y_1$ or $Y_2$ represents a hydrogen atom or a cation.

2. A water-soluble polymer dispersion according to claim 1, wherein the polyalkylenimine is polyethylenimine.

3. A water-soluble polymer dispersion according to claim 1, wherein the polyalkylenimine amounts to 20 to 200% by mass relative to the water-soluble polymer.

4. A water-soluble polymer dispersion in which a water-soluble polymer having at least one type of ionicity selected from among anionicity and nonionicity and occurring in the form of fine particles with a particle size of not greater than 100 μm and a polyalkylenimine in the sulfate salt form coexist, wherein the polymer is produced by dispersion polymerization of a monomer composition (mixture) comprising at least one monomer selected from among monomers represented by said general formula (3) given above and water-soluble nonionic monomers in the presence of said polyalkylenimine in the sulfate salt form.

5. A water-soluble polymer dispersion in which a water-soluble polymer having at least one type of ionicity selected from among cationicity, an amphotericity, a nonionicity and an anionicity and occurring as fine particles with a particle size of not greater than 100 μm and a polyalkylenimine in the sulfate salt form coexist,
wherein the polyalkylenimine is polyethylenimine.

6. A water-soluble polymer dispersion according to claim 5, wherein the polyalkylenimine amounts to 20 to 200% by mass relative to the water-soluble polymer.

7. A water-soluble polymer dispersion according to claim 6, wherein the water-soluble polymer is produced by dispersion polymerization of a monomer composition (mixture) comprising at least one monomer selected from among monomers represented by said general formula (3) given below and water-soluble nonionic monomers in the presence of said polyalkylenimine in the sulfate salt form;

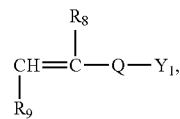

General formula (3)

wherein the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or $COO$, $R_9$ represents a hydrogen atom or $COOY_2$, and $Y_1$ or $Y_2$ represents a hydrogen atom or a cation.

8. A water-soluble polymer dispersion in which a water-soluble polymer having at least one type of ionicity selected from among cationicity, an amphotericity, a nonionicity and an anionicity and occurring as fine particles with a particle size of not greater than 100 μm and a polyalkylenimine in the sulfate salt form coexist,
wherein the polyalkylenimine amounts to 20 to 200% by mass relative to the water-soluble polymer.

9. A method of producing water-soluble polymer dispersions, wherein a dispersion of fine particles of a polymer having at least one type of ionicity selected from among cationicity and amphotericity is produced by subjecting a monomer (or monomer mixture) comprising 5 to 100 mole percent of a monomer represented by the general formula (1) and/or (2) given below, 0 to 50 mole percent of a monomer represented by the general formula (3) given below and 0 to 95 mole percent of a water-soluble nonionic monomer to dispersion polymerization with stirring in the presence of a polyalkylenimine in the sulfate salt form;

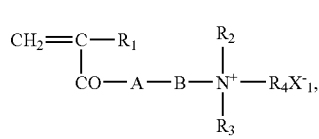

General formula (1)

wherein the general formula (1), $R_1$ is a hydrogen atom or a methyl group, $R_2$ and $R_3$ may be the same or different and each is an alkyl or alkoxy group containing 1 to 3 carbon atoms or a benzyl group, $R_4$ is a hydrogen atom, an alkyl or alkoxy grqup containing 1 to 3 carbon atoms or a benzyl group. A represents an oxygen atom or NH, B represents an alkylene or alkoxylene group containing 2 to 4 carbon atoms, and $X_1$ represents a sulfate anion;

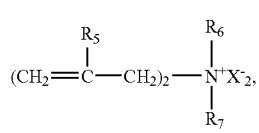

General formula (2)

wherein the general formula (2), $R_5$ represents a hydrogen atom or a methyl group, $R_6$ and $R_7$ each represents an alkyl or alkoxy group containing 1 to 3 carbon atoms or a benzyl group, and $X_2$ represents a sulfate anion;

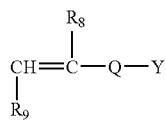

General formula (3)

wherein the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or COO, $R_9$ represents a hydrogen atom or $COOY_2$, and $Y_1$ or $Y_2$ represents a hydrogen atom or a cation.

10. A method of producing water-soluble polymer dispersions, wherein a dispersion of fine particles of a polymer having at least one type of ionicity selected from among anionicity and nonionicity is produced by subjecting a monomer composition (mixture) comprising at least one monomer selected from among monomers represented by the general formula (3) given below and water-soluble nonionic monomers to dispersion polymerization with stirring in the presence of a polyalkylenimine in the sulfate salt form;

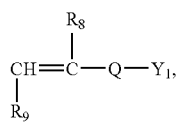

General formula (3)

wherein the general formula (3), $R_8$ represents a hydrogen atom, a methyl group or a carboxymethyl group, Q represents $SO_3$, $C_6H_4SO_3$, $CONHC(CH_3)_2CH_2SO_3$, $C_6H_4COO$ or COO, $R_9$ represents a hydrogen atom or $COOY_2$, and $Y_1$ or $Y_2$ represents a hydrogen atom or a cation.

11. A use of the water-soluble polymer dispersion according to any of claims 1, 4, 5, 8, 2, 3, 6 and 7, wherein the water-soluble polymer dispersion is added to papermaking raw material before papermaking for pretreatment thereof.

12. A use of the water-soluble polymer dispersion according to any of claims 1, 4, 5, 8, 2, 3, 6 and 7, wherein the water-soluble polymer dispersion is added to papermaking raw material before papermaking to thereby improve the freeness thereof.

13. A use of the water-soluble polymer dispersion according to any of claims 1, 4, 5, 8, 2, 3, 6 and 7, wherein the water-soluble polymer dispersion is added to papermaking raw material before papermaking, in which a sizing agent coexists, to thereby improve the degree of sizing.

14. A use of the water-soluble polymer dispersion according to any of claims 1, 4, 5, 8, 2, 3, 6 and 7, wherein the water-soluble polymer dispersion is added to paper making raw material before papermaking to thereby improve the yield, followed by papermaking.

15. A use of the water-soluble polymer dispersion according to any of claims 1, 4, 5, 8, 2, 3, 6 and 7, wherein the water-soluble polymer dispersion is added to paper making raw material before papermaking in combination with an inorganic and/or organic anionic substance to thereby improve the yield, followed by papermaking.

16. A use of the water-soluble polymer dispersion according to any of claims 1, 4, 5, 8, 2, 3, 6 and 7, wherein the water-soluble polymer dispersion is added to organic sludge or paper mill-derived sludge to cause flocculation, followed by dewatering by means of dewatering equipment.

17. A use of the water-soluble polymer dispersion according to any of claims 1, 4, 5, 8, 2, 3, 6 and 7, wherein the water-soluble polymer dispersion is added to organic sludge or paper mill-derived sludge in combination with an amphoteric or anionic water-soluble polymer to cause flocculation, followed by dewatering by means of dewatering equipment.

* * * * *

UNITED STATES PATENT AND TRADEMARK OFFICE
CERTIFICATE OF CORRECTION

PATENT NO. : 7,300,545 B2  Page 1 of 1
APPLICATION NO. : 10/517011
DATED : November 27, 2007
INVENTOR(S) : Takumi Ohara et al.

It is certified that error appears in the above-identified patent and that said Letters Patent is hereby corrected as shown below:

Column 28, Claim 7, Line 12, "$CH_{2s03}$" should read --$CH_2$ $SO_3$--;

Column 28, Claim 9, Line 50 "grqup" should read --group--.

Signed and Sealed this

Fifth Day of August, 2008

JON W. DUDAS
*Director of the United States Patent and Trademark Office*